United States Patent
Osterlanger et al.

(10) Patent No.: US 8,607,939 B2
(45) Date of Patent: Dec. 17, 2013

(54) BRAKING DEVICE, IN PARTICULAR FOR A MOTOR VEHICLE

(75) Inventors: Jurgen Osterlanger, Emskirchen (DE); Stefanie Barthlein, Baudenbach (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 413 days.

(21) Appl. No.: 12/727,005

(22) Filed: Mar. 18, 2010

(65) Prior Publication Data

US 2010/0236877 A1  Sep. 23, 2010

(30) Foreign Application Priority Data

Mar. 21, 2009 (DE) .......................... 10 2009 014 339

(51) Int. Cl.
*F16D 55/08* (2006.01)
(52) U.S. Cl.
USPC ........................................................ 188/72.8
(58) Field of Classification Search
USPC ................................ 188/71.1, 72.1, 72.7, 72.8
See application file for complete search history.

(56) References Cited

U.S. PATENT DOCUMENTS

| 2,306,048 | A  | * | 12/1942 | Fast ............................... 384/302 |
| 6,767,305 | B2 | * | 7/2004 | Backes et al. ................. 475/149 |
| 6,938,735 | B1 | * | 9/2005 | Hilzinger ..................... 188/72.1 |
| 7,007,775 | B2 | * | 3/2006 | Kapaan et al. ........... 188/1.11 E |
| 7,156,212 | B1 | * | 1/2007 | Ciotti et al. ................. 188/72.4 |
| 2004/0112690 | A1 | * | 6/2004 | Sekiguchi ..................... 188/72.7 |
| 2008/0116021 | A1 | * | 5/2008 | Matsuzaki ................... 188/72.5 |

FOREIGN PATENT DOCUMENTS

DE  198 31 838 A1  7/1999

* cited by examiner

*Primary Examiner* — Anna Momper
(74) *Attorney, Agent, or Firm* — Lucas & Mercanti, LLP

(57) ABSTRACT

A braking device, in particular for a motor vehicle, which has a brake disk, a brake caliper fitting around the brake disk, and two brake pads, which rest against the brake disk for the purpose of braking. One of the brake pads can be moved by a motor-driven ball screw which has a threaded spindle and a threaded nut. The ball screw is accommodated within the brake caliper. The threaded nut is connected to a piston which has the brake pad and which is seated on the threaded nut in such a way that it can be tilted relative to the threaded nut, and/or wherein the threaded spindle is mounted on the brake caliper in such a way that it can be tilted relative to the brake caliper.

6 Claims, 3 Drawing Sheets

BRAKING DEVICE, IN PARTICULAR FOR A MOTOR VEHICLE

This application claims the priority of DE 10 2009 014 339.4 filed Mar. 21, 2009, which is incorporated by reference herein.

FIELD OF THE INVENTION

The invention relates to a braking device, in particular for a motor vehicle, comprising a brake disk, a brake caliper fitting around the brake disk, and two brake pads, which rest against the brake disk for the purpose of braking and of which one can be moved by means of a motor-driven ball screw comprising a threaded spindle and a threaded nut, which ball screw is accommodated within the brake caliper.

BACKGROUND OF THE INVENTION

Braking devices of the type under consideration are used primarily in motor vehicles, for example to provide an electromechanical parking brake. A braking device of this kind is known from DE 198 31 838 B4, for example. The braking device generally comprises a rotating brake disk, around which there fits a brake caliper, a substantially C-shaped metallic component. Provided in the brake caliper are two brake pads, one of which is usually positionally fixed while the other can be moved vertically relative to the brake disk. For this purpose, use is made of a ball screw, which can be driven by means of a motor, which is frequently likewise arranged on the brake caliper or on a housing provided on the latter, the ball screw being coupled motionally to the movable brake pad. In the case of the braking appliance known from DE 198 31 838 B4, the brake pad is connected to the threaded spindle. To apply both brake pads to the brake disk, i.e. for braking, the motor is actuated and the ball screw is moved in such a way that the movable brake pad is pressed onto the brake disk, which for its part is then clamped between the two brake pads. To release the brake, the motor is actuated in the other direction, thereby operating the ball screw in the other direction and moving the movable brake pad out of its braking contact with the brake disk.

With braking appliances of this kind, it has been found to be problematic that the considerable actuating forces involved in pressing the brake pads against the brake disk cause the brake caliper to bend. This bends "open", i.e. the ball screw, which is mounted in a fixed manner on the brake caliper, is effectively supported against the brake disk and bends the brake caliper open if the axial contact force is sufficiently high. This results in an axial offset together with angle errors between the nut and the spindle and any axial and radial bearings. This leads to highly uneven load distribution in the bearings by means of which the ball screw is rotatably mounted on the brake caliper, and this can lead to premature failure.

SUMMARY OF THE INVENTION

The object on which the invention is based is to specify a braking device which allows compensation of any axial offsets resulting from the brake caliper bending open and hence of any excess bearing loads.

To solve this problem, the invention provides that, in a braking device of the type stated at the outset, the threaded nut is connected to a piston which has the brake pad and which is seated on the threaded nut in such a way that it can be tilted relative to the threaded nut, and/or that the threaded spindle is mounted on the brake caliper in such a way that it can be tilted relative to the brake caliper.

In the braking device according to the invention, there is a certain relative movability between various components that are subjected to loads during braking owing to the operation of the ball screw, this movability allowing a change in the position of the components relative to one another, thereby making it possible to at least partially compensate any axial offset or bearing load. Thus, according to a first alternative form of the invention, the threaded nut is connected to a piston or this piston is seated directly on the threaded nut, not rigidly but in such a way that it can be tilted about the longitudinal axis of the spindle (which coincides with the longitudinal axis of the nut). This means that the piston can tilt or pivot somewhat in any direction relative to the threaded nut. The effect is that although the axis of the spindle and hence also the axis of the nut is likewise tilted somewhat as the brake caliper is bent open, this tilting does not act directly on the coupled piston as well. On the contrary, the said piston can tilt slightly relative to the nut, and load compensation in this area is thereby achieved. A movable system is therefore achieved here.

As an alternative or in addition, a second possibility for movement is to mount the threaded spindle on the brake caliper in such a way that it can be tilted relative to the brake caliper. In this embodiment of the invention, the threaded spindle is mounted directly on the brake caliper by means of an appropriate bearing, preferably a radial sliding bearing in conjunction with an axial needle bearing. However, this bearing arrangement is not rigid either but allows a certain movability of the threaded spindle relative to the brake caliper. When the brake caliper now spreads apart, the bending of the caliper can be compensated as a result of at least partial balancing out of the change in position through slight tilting of the spindle in the movable bearing arrangement on the brake caliper. This means that a compensating possibility of movement is implemented in this area as well, the said movement leading to relief of loads on the bearing arrangement.

Although, as described, there is the possibility of implementing either one or the other instance of movability it is expedient to provide both instances of movability in order to achieve a compensating effect which is as great as possible.

As a development of the invention, it may be provided, where the piston is tilt-mounted on the nut, to achieve this tilt-mounting by providing a first conical guide surface on the nut and a second conical guide surface on the piston, which surfaces rest against one another, at least one guide surface being crowned. The nut and the piston come into contact only in the region of the guide surfaces, which are both basically conical, thereby providing centering. However, at least one of the guide surfaces has a slight crown which makes it possible for the piston to tilt slightly relative to the nut (by 0.5° or less in operation, for example). It is also conceivable to make both guide surfaces crowned. The piston itself is expediently a hollow cylinder, and the threaded spindle is accommodated in the piston, preferably over the entire length of its threaded portion. This produces a system which is largely closed and the nut is as a consequence effectively encapsulated in the piston.

To achieve the second instance of movability, namely the movability of the threaded spindle relative to the brake caliper, the invention provides that the threaded spindle be mounted on the brake caliper by means of a radial bearing and an axial bearing, which are positionally fixed relative to the brake caliper, the threaded spindle being mounted in or on both bearings in such a way that it can be tilted. Thus, if such a dual bearing arrangement is used, in which the radial bearing and the axial bearing are provided in a positionally fixed manner on the brake caliper, movability of the threaded spindle relative to both bearings can be achieved. In the case of the radial bearing, which, as a sliding bearing, is relatively simple to design, this fundamental mobility is already given by a certain elasticity of the bearing or a certain play of the threaded spindle in the radial bearing. In the case of the axial bearing, a first guide surface is expediently provided on a bearing disk of the axial bearing and a second guide surface is provided on the threaded spindle, which surfaces rest against one another, at least one guide surface being crowned. The basic design is thus similar to that for the movable mounting of the piston relative to the threaded nut and, here too, the guide surfaces are preferably conical, while at least one of them is crowned. Here too, both guide surfaces may be crowned.

BRIEF DESCRIPTION OF THE DRAWING

An exemplary embodiment of the invention is depicted in the drawings and is explained in greater detail below. In the drawings.

DETAILED DESCRIPTION OF THE DRAWING

Figure 1:
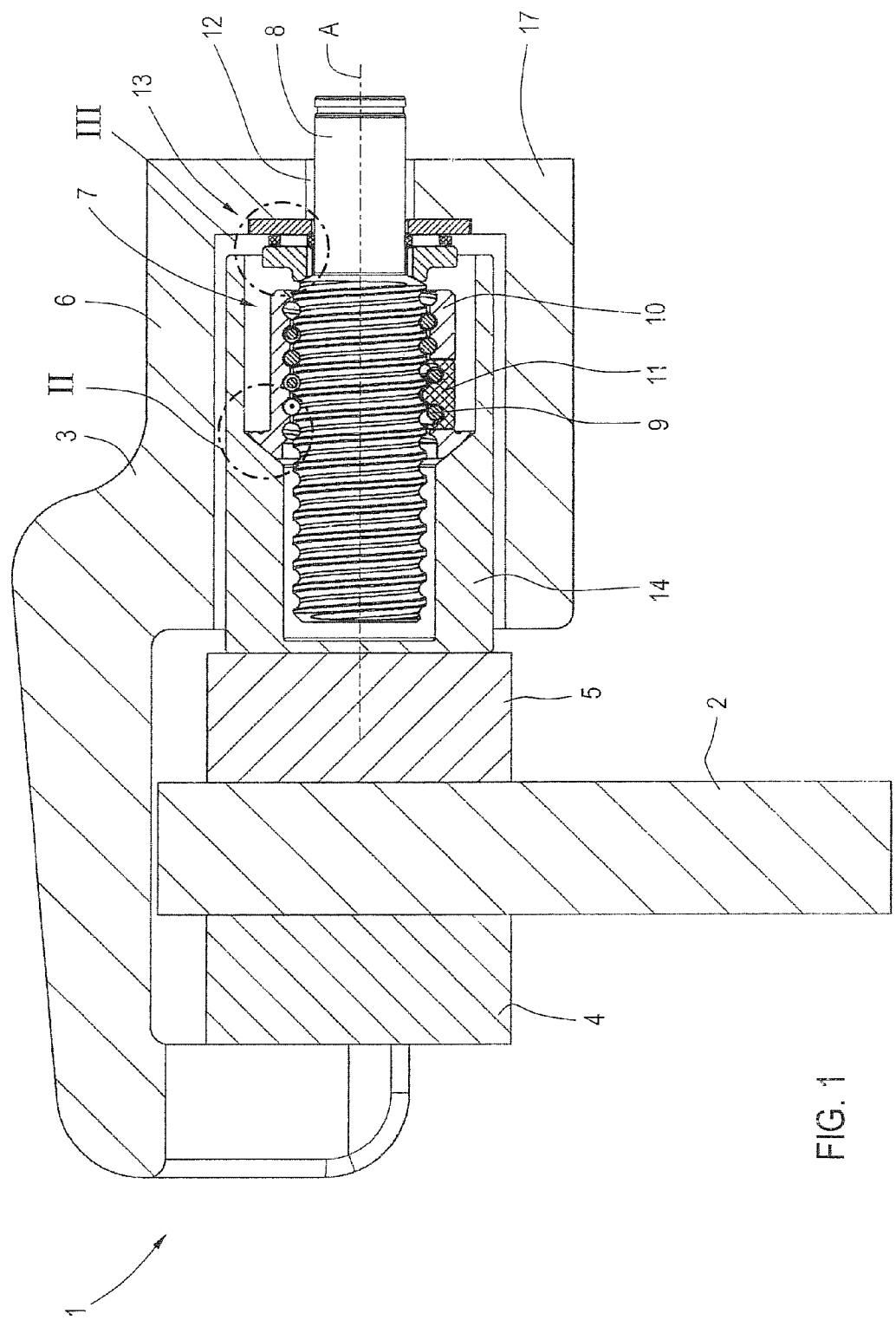
FIG. 1 shows a schematic diagram in section of a braking device according to the invention in the unloaded condition.

FIG. 1 shows a braking device 1 according to the invention of the type which may be implemented as a parking brake in a motor vehicle, for example. The braking device 1 comprises a brake disk 2, which is connected in a known way to the wheel, and a brake caliper 3 of substantially C-shaped cross section, which fits over the brake disk 2. Accommodated in the said brake caliper are two brake pads 4, 5, which are positioned on both sides of the brake disk 2 arranged between them and, for the purpose of braking, rest firmly against the latter, clamping the brake disk between them in the process. FIG. 1 shows the release position, that is to say when the brake disk 2 is not clamped and the brake disk 2 can rotate freely between the two brake pads 4, 5, even though these are resting directly against the brake disk for the sake of the illustration. In actual fact, there is a minimal gap between the brake disk 2 and the brake pads 4, 5, allowing free rotation in the release position.

FIG. 1 furthermore shows a ball screw 7, which is accommodated in a portion 6 of the brake caliper 3 that may be of the housing type and which comprises a threaded spindle 8, on which a threaded nut 10 runs in a manner guided by balls 9, the balls 9 circulating continuously and being constantly returned by means of at least one ball return element 11. The spindle 8 is connected to a drive motor (not shown specifically here), which is preferably arranged in the region of the outside of the housing-type portion 6 and the output shaft of which is at an angle of 90°, for example, to the threaded spindle 8. Its output shaft is coupled to the threaded spindle 8 by way of a cardan joint, which allows the threaded spindle 8 to be motor-driven. The threaded spindle 8 is furthermore rotatably mounted in a fixed position on the brake caliper 3 by means of a radial bearing 12 and an axial bearing 13, in the present case in the form of a needle bearing.

The threaded nut 10, for its part, is coupled to a piston 14, and the said piston rests on the front end edge of the threaded nut 10, i.e. is supported there. The movable brake pad 5 is arranged on the piston 14. When a suitable actuating element on the vehicle-side is now actuated to activate the drive motor (not shown specifically) in order to actuate the braking device and hence to fix the brake disk 2, the threaded spindle 8 is moved by the drive motor and rotates, with the result that the threaded nut 10 travels along the threaded spindle 8, being guided by the balls 9 in the process, i.e. moves to the left in FIG. 1. During this process, the piston 14 seated on the end face of the threaded nut 10, and together with it the brake pad 5, is pushed to the left, with the result that it is brought firmly into contact with the brake disk, which is supported against the other brake pad 4, whereby said brake disk is fixed between the two brake pads 4, 5.

Figure 2:
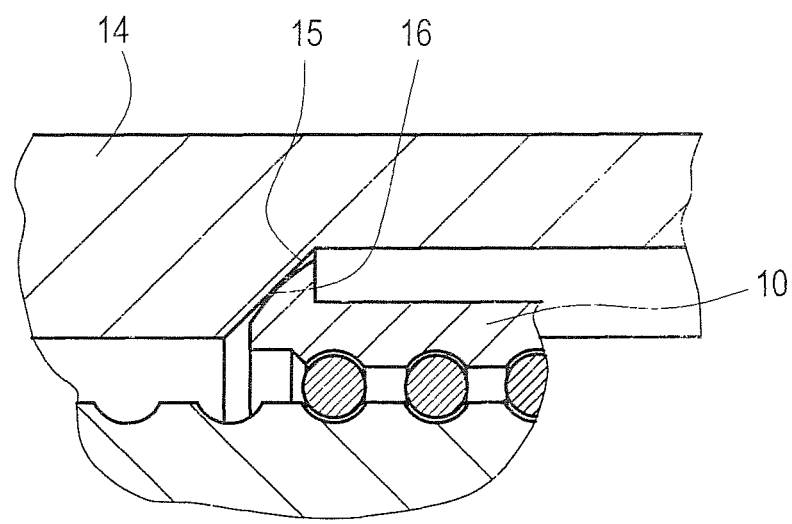
FIG. 2 shows an enlarged detail of area II in FIG. 1.

FIG. 2 shows on an enlarged scale a detail view of the seating region of the piston 14 on the threaded nut 10. The piston 14 has a conical guide surface 15, opposite which is a second guide surface 16 on the end of the threaded nut 10, the said second guide surface likewise being conical in terms of its basic shape but having a crowned or convex external form. This means that there is no extensive contact here but only linear bearing of guide surface 15 on guide surface 16. The effect is that the piston 14 is seated in a movable fashion on the nut 10, i.e. guide surface 15 can move on guide surface 16 owing to the linear support. The piston 14 can therefore tilt relative to the threaded nut 10 and a movable bearing arrangement is achieved, with lubrication by means of a suitable lubricant to reduce friction.

Figure 3:
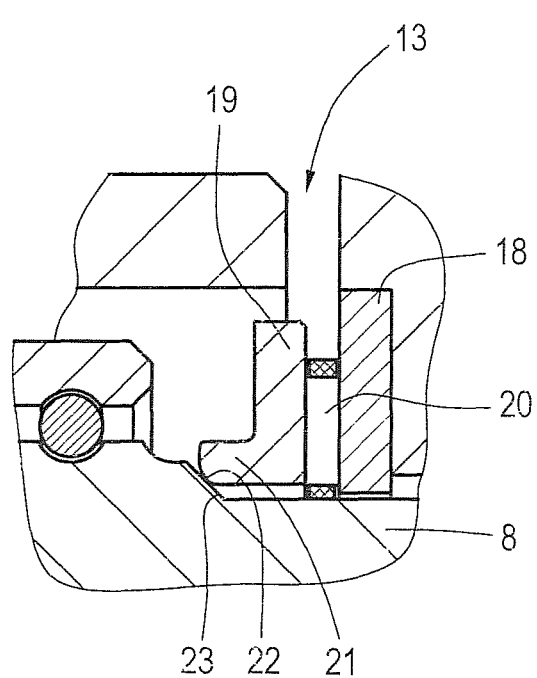
FIG. 3 shows an enlarged detail of area III in FIG. 1.

As FIG. 3 shows in an enlarged detail, a bearing arrangement which is likewise movable is achieved in the region of support of the threaded spindle 8 on the brake caliper 3. As explained, the threaded spindle 8 is supported on the wall 17 of the brake caliper, on the one hand radially by means of the radial bearing 12 and, on the other hand, by means of the axial bearing 13. This axial bearing comprises a first bearing disk 18 (housing disk), which is arranged in a fixed position on the wall 17, and a second bearing disk 19 (shaft disk), which runs on the first bearing disk 18 by way of needle rolling elements 20. Bearing disk 19 has an axial collar 21, which has a guide surface 22 that, like guide surface 16 in the arrangement for supporting the piston 14 on the threaded nut 10, has a crowned convex surface with a basic shape that is preferably substantially conical.

The threaded spindle 8, for its part, has a guide surface 23 which—like the guide surface 15 in the arrangement for supporting the piston 16 on the nut 10—is conical, i.e. is a flat surface. It is therefore evident in this case also that a movable bearing arrangement is achieved since, here too, guide surface 23 rests on guide surface 22 only along a line but not over an area. The effect is that the threaded spindle 8 can tilt somewhat relative to the positionally fixed axial bearing 13, or relative to the positionally fixed bearing disk 19, respectively, lubrication likewise being provided. This tilting is made possible by the fact that the threaded spindle 8 is likewise accommodated with a certain play in the radial bearing 12, which is to say the radial bearing, a plastic sliding bearing for example, allows a certain tilting. During operation, when the caliper expands owing to the forces that are acting, the tilt angle is in a range of distinctly <0.5° per mobile bearing location and, as a result, the sliding bearing 12 is not subjected to significant loads.

Of course, it is possible with both bearing locations to implement the crowning on the respective other guide surface or to make both guide surfaces crowned.

Thus, in the braking device 1 according to the invention, two movable bearing locations are implemented, namely in the region of the seating of the piston 14 on the nut 10 on the one hand, and in the region of the seating of the threaded spindle 8 on the axial bearing 13, on the other hand. The effect is then that tilting of the relevant axes, which is present in known braking devices and results in high bearing loads that can lead to premature bearing failure, can be compensated to a large extent, thus making it possible to significantly reduce bearing loads.

In the unloaded position shown in FIG. 1, the three longitudinal axes of the threaded spindle 8, the brake caliper 3 or, more specifically, the preferably cylindrical housing-type portion 6, and the piston 14 coincide and are denoted in this figure as a common axis with the letter A.

Figure 4:
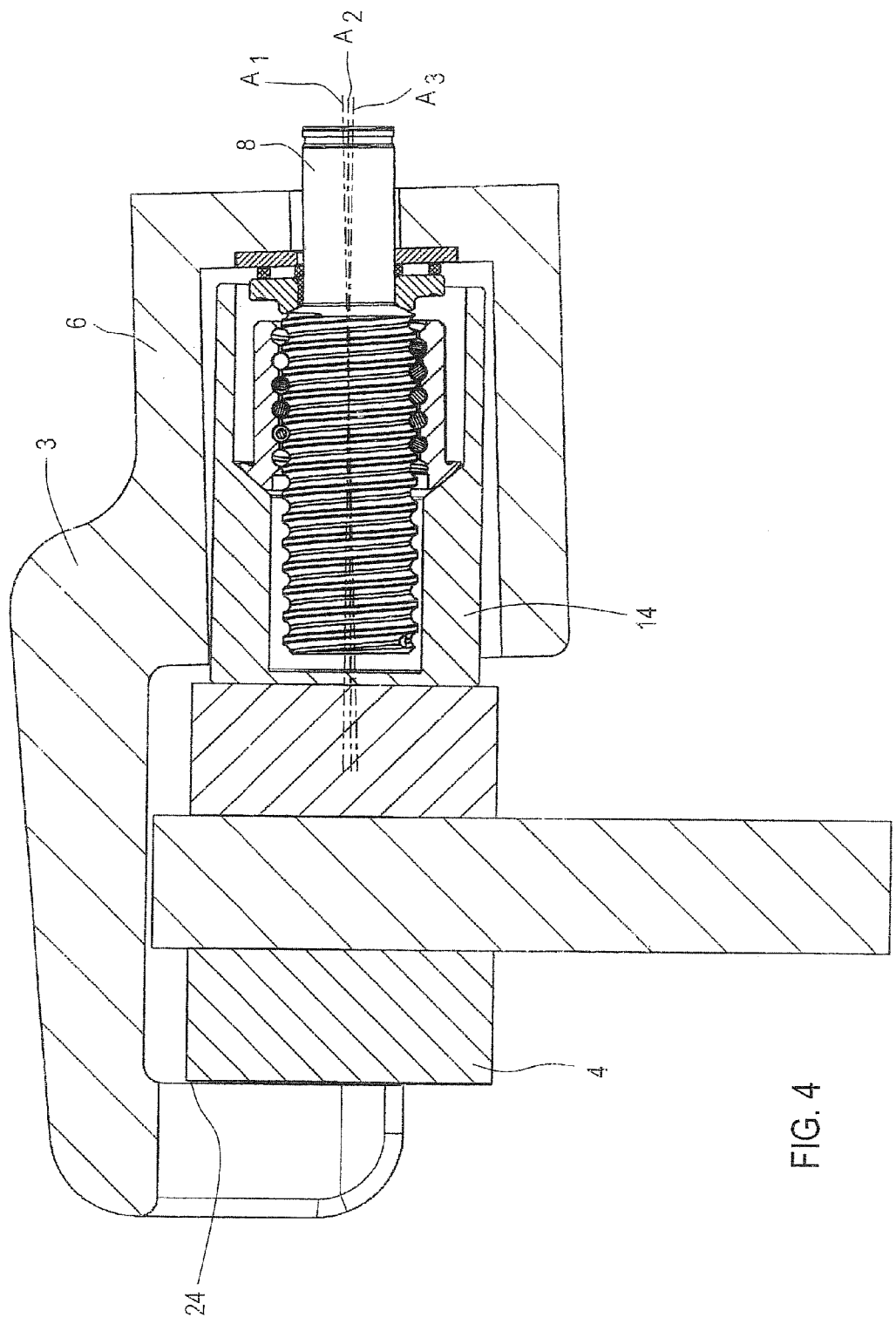
FIG. 4 shows the braking device from FIG. 1 in the loaded condition with elements tilted relative to one another.

When the motor (not shown) is now used to activate the threaded spindle 8 and, by means of the latter, the piston 14 and with it the brake pad 5 is pressed against the brake disk 2, the brake caliper 3 is expanded or spread apart to a greater or lesser extent, depending on the contact force, as shown in FIG. 4. As can be seen, the brake caliper 3 expands and, on the one hand, a slight gap 24 is formed in the region of brake caliper contact with the first brake pad 4, and, as can also clearly be seen, portion 6 of the brake caliper 3 adopts an angled position relative to the piston 14. At this point, it should be pointed out that FIG. 4 shows a significantly exaggerated expansion and tilting of components compared with that which occurs in reality, this being for the sake of illustration.

By virtue of the two separate instances of movability or movable bearing arrangements that are implemented, however, this severe angular offset can be effectively split up and the load acting on the axial bearing can be significantly reduced. This is because, on the one hand, the tilting of the brake caliper 3, i.e. its spreading apart, has the effect that the piston 14 tilts slightly relative to the nut 10, this being obtained by means of the movable seating of the piston 14 on the nut 10 via the guide surfaces 15, 16, as shown in detail in FIG. 2. In the same way, there is slight tilting of the seating of the threaded spindle 8 on the axial bearing 13 or bearing disk 19 by virtue of the mobile bearing arrangement implemented there, as shown in FIG. 3. Here too, there is therefore an albeit slight relative movement or tilting movement. That is to say that the components the piston 14, the threaded nut 10, the threaded spindle 8, and the axial bearing 13 and bearing disk 19 consequently adjust relative to one another in pairs under the effect of load and consequently there is splitting and hence, at the same time, a local reduction of the individual tilt angles. The movement of the axial bearing 13 relative to the threaded spindle 8 also has the effect that the threaded spindle 8 moves or tilts relative to the radial bearing 12, as is likewise illustrated in FIG. 4. While all the longitudinal axes coincide in FIG. 1 as described, there is now an axial offset owing to the expansion of the brake caliper, but this is significantly less owing to the instances of movability achieved than it would be with a rigid bearing arrangement. As can be seen, the individual axes $A_1$ of the brake caliper 3, $A_2$ of the ball screw 7 or threaded spindle 8, and $A_3$ of the piston 14 no longer coincide, but the respective axial offset is nevertheless relatively small. The maximum skewing or tilting of about 0.5° of the brake caliper axis relative to the normal to the brake disk which occurs in actual operating conditions can be well compensated by the decoupling of the components which is provided for by the invention, i.e. by their movability relative to one another, with the result that, overall, either the ball screw can be constructed with somewhat smaller dimensions and/or the service life of the bearings increases significantly.

LIST OF REFERENCE SIGNS

1 Braking device
2 Brake disk
3 Brake caliper
4 Brake pad
5 Brake pad
6 Housing-type portion
7 Ball screw
8 Threaded spindle
9 Balls
10 Threaded nut
11 Ball return element
12 Radial bearing
13 Axial bearing
14 Piston
15 Conical guide surface
16 Guide surface
17 Wall
18 First bearing disk
19 Second bearing disk
20 Needle rolling element
21 Axial collar
22 Guide surface
23 Guide surface
A Common axis
$A_1$ Axis of the brake caliper
$A_2$ Axis of the ball screw
$A_3$ Axis of the piston

The invention claimed is:

1. A braking device for a motor vehicle, comprising:
a brake disk;
a brake caliper fitting around the brake disk; and
two brake pads, which rest against the brake disk for the purpose of braking;
a motor-driven ball screw, which is capable of moving one of the two brake pads and arranged within the brake caliper, having a threaded spindle and a threaded nut; and
a piston, which is in contact with the one of the two brake pads, the piston being a hollow cylinder, a first conical guide surface being disposed on the threaded nut and a second conical guide surface being disposed on the piston, the threaded nut disposed at least partially within the hollow cylinder with the first conical guide surface and the second conical guide surface resting against one another, and at least one of the first conical guide surface and the second guide surface being crowned in such a way that the piston can be tilted relative to the threaded nut,
wherein the threaded spindle is mounted on the brake caliper in such a way that the threaded spindle can be tilted relative to the brake caliper.

2. The braking device of claim 1, wherein the threaded spindle is accommodated in the piston.

3. The braking device of claim 2, wherein the threaded spindle is accommodated in the piston over an entire length of a threaded portion.

4. The braking device of claim 1, wherein the threaded spindle is mounted on the brake caliper by a radial bearing and an axial bearing, which are positionally fixed relative to the brake caliper, the threaded spindle being mounted in or on both the radial bearing and the axial bearing in such a way that the threaded spindle can be tilted.

5. The braking device of claim 4, wherein a bearing disk of the axial bearing has a first conical guide surface and the threaded spindle has a second conical guide surface, which first conical guide surface and second conical guide surface rest against one another and at least one guide surface is crowned.

6. The braking device of claim 1, wherein the hollow cylinder has a first cylindrical section with a first inner diameter and a second cylindrical section with a second inner diameter, the first inner diameter being smaller than the second inner diameter, and the second conical guide surface being disposed between the first and second cylindrical sections.

* * * * *